Patented Oct. 2, 1945

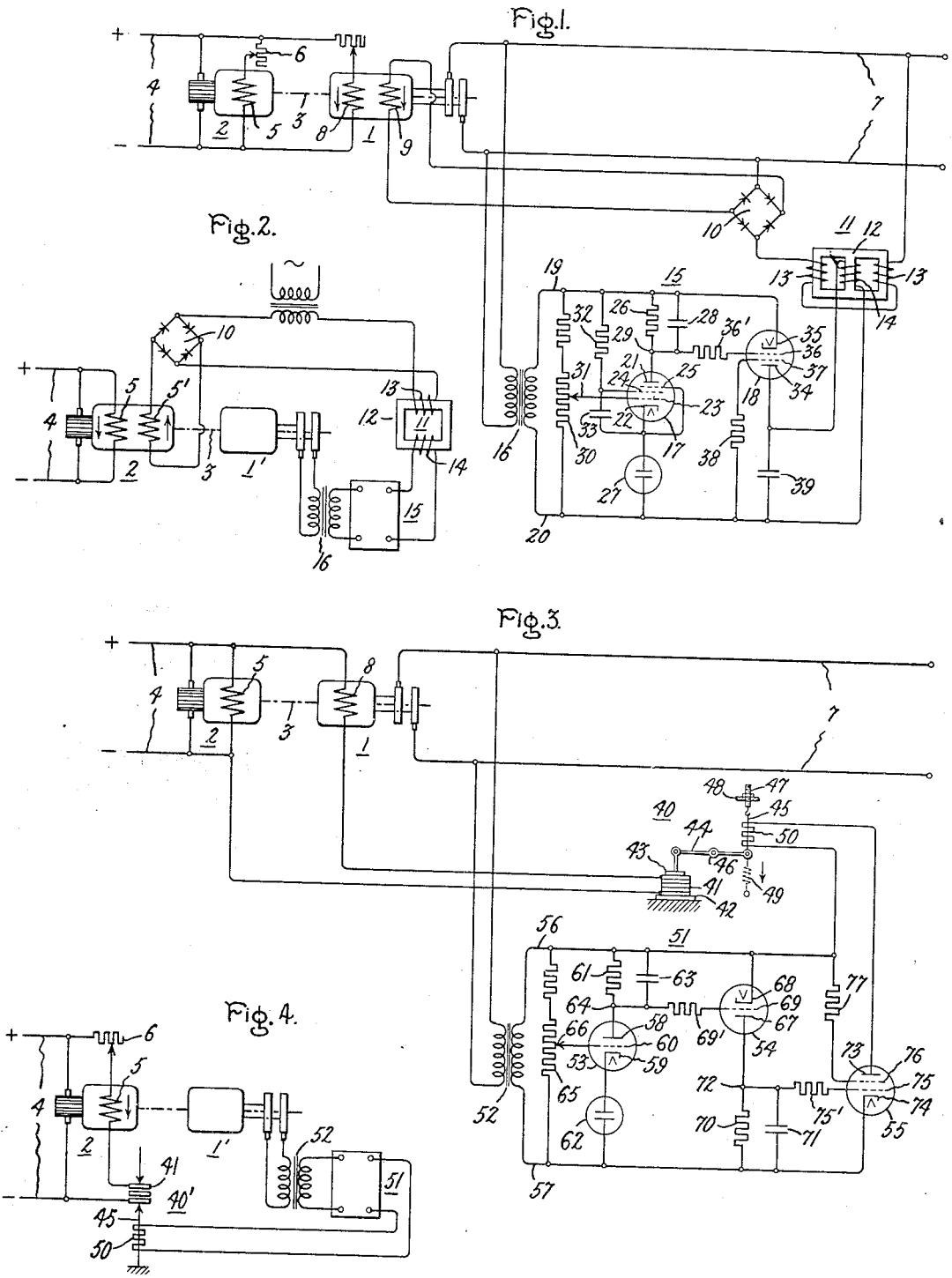

2,386,040

UNITED STATES PATENT OFFICE 2,386,040

ELECTRIC CONTROL SYSTEM

Martin A. Edwards, Scotia, N. Y., assignor to General Electric Company, a corporation of New York Application September 28, 1942, Serial No. 459,904

12 Claims. (Cl. 171—119)

My invention relates to electric control systems and more particularly to electric valve control or regulating systems for electric circuits or dynamo-electric machines.

Electric valve apparatus is particularly adapted to systems for controlling or regulating an electrical condition of a dynamo-electric machine or circuit, since the electric valve system usually has no moving parts or vibrating or switching contacts and can be made to respond, without appreciable delay, to any desired variation of the quantity to be controlled or regulated. Heretofore, it has been customary in regulating alternating current machines or circuits by electric valve circuits to rectify an alternating component of the electrical condition to be controlled and utilize an electric valve system operating as a direct current amplifier of the variable rectified quantity to produce a direct current controlling voltage or current to effect the desired regulation or control. Such rectifiers are not desirable in certain regulating and control systems and have certain disadvantages by reason of the requirement for rectification and also with regard to the increase above ground of the anode potentials of the successive valves of the electric valve system. Other regulating systems heretofore used, particularly for regulating the voltage of small alternating current generators with a short time constant field circuit, introduce undesirable voltage transients in the alternating voltage output. In certain applications, however, it is necessary to avoid such voltage transients.

It is an object of my invention to provide a new and improved electric valve control or regulating circuit.

It is another object of my invention to provide a new and improved electric valve regulating system for electric circuits or dynamo-electric machines.

It is a further object of my invention to provide a new and improved voltage regulating system for alternating current generators.

It is a still further object of my invention to provide a new and improved speed regulating system for direct current motors.

In accordance with my invention, an alternating component of voltage varying in accordance with the condition to be regulated is impressed as an alternating voltage on an electric valve system in which successive valve stages of the system are oppositely poled and controlled in accordance with a control potential provided in one half cycle by a preceding valve stage and maintained to control the next succeeding stage on the opposite half cycle. In some of the illustrated embodiments of my invention, the controlling quantity derived from the electric valve system varies inversely with the variations of the condition being controlled and may effect its regulating action indirectly through such a device as a direct current biased saturable reactor or differentially acting control winding, whereas in other illustrated embodiments the controlling quantity derived from the electric valve system varies directly with the condition being controlled and may effect its control directly through a variable resistance regulating element or control winding.

My invention will be better understood from the following description taken in connection with the accompanying drawing, and its scope will be pointed out in the appended claims.

In the accompanying drawing, Fig. 1 is a diagrammatic representation of one embodiment of my invention for controlling an alternating current generator wherein the regulation is effected without any moving parts or contact devices; Fig. 2 diagrammatically illustrates an adaptation of the arrangement of Fig. 1 for controlling the speed of a motor; Fig. 3 is another embodiment of my invention which is adapted to effect regulation of an alternating current generator; and Fig. 4 is a diagrammatic illustration of an adaptation of the arrangement of Fig. 3 for controlling the speed of a motor.

Referring now to Fig. 1 of the drawing, I have shown, by way of illustration, an embodiment of my invention as applied to regulating the voltage of an alternating current generator 1 which is adapted to be driven by a suitable prime mover such as a direct current motor 2 coupled to drive generator 1 by the shaft coupling 3. The direct current motor is connected to be energized from a direct current supply circuit 4 and may be of any suitable type depending upon the frequency characteristic desired from generator 1. It will be assumed that a constant frequency output is desired and I have shown a shunt motor provided with a shunt field winding 5 as representative of a constant speed motor. Although the regulating system is satisfactory for regulating generators of the commercial power range frequencies of 25 to 60 cycles it is particularly suitable for generators having a frequency of several hundred cycles per second. Where the variations of frequency of generator 1 must be held within very narrow limits, some suitable form of speed regulator may be necessary to control the motor speed. Such a regulator is indicated diagrammatically by the variable resistance 6 connected in series relation with field winding 5. Embodiments of my invention suitable for such speed regulation are described later.

Generator 1 has an output circuit 7 and is provided with a direct current field winding 8 which may be connected to any suitable direct current source such as the direct current supply circuit 4. The field winding 8 may be arranged to furnish a substantial portion of the generator excitation, for example, of the order of ninety per cent. I also provide an auxiliary field winding 9 which is utilized to effect the regulating action and have indicated that this winding is in cumulative relation with respect to field winding 8 by the arrows placed along the winding. However, if the regulating system provides an increase in field current upon a rise of generator voltage it will be evident that the winding 9 should be placed in differential relation. Field winding 9 is variably energized from an alternating current source and may be connected to the alternating current output circuit 7 through any suitable rectifying means 10, such as electric valve means or dry-plate contact rectifiers, as illustrated, of the copper oxide or selenium type. The voltage applied to the input terminals of the rectifier 10 and, hence, the output voltage applied to the controlling field winding 9 is varied in accordance with any departure of the output voltage from a predetermined value. A satisfactory means for effecting this voltage variation is a variable impedance means 11. The variable impedance means 11 is shown in the form of a direct current biased reactor comprising a three-legged core structure 12 with alternating current windings 13 on the two outer legs and a direct current winding 14 on the middle leg. The winding 14 is connected to be variably energized from the output of the electric valve regulating system 15. It will, of course, be understood that other suitable forms of reactors may be used, if desired, such as the four-legged type of reactor disclosed in Alexanderson Patent No. 1,328,610 of January 20, 1920.

The electric valve regulating system 15 is connected to be energized in accordance with the voltage to be regulated and, as illustrated, may be connected at a suitable point on the load circuit 7 through a transformer 16. To effect the desired regulating action, I employ two reversely connected electric valves 17 and 18 such as electric valves of the high vacuum type connected across the output circuit of transformer 16 to supply a variable direct current to the winding 14. The output circuit of transformer 16 comprises a top conductor 19 (as viewed in the drawing) and a bottom conductor 20. The electric valve 17 is provided with an anode 21, a cathode 22, a control grid 23, a screen grid 24, which is employed as a second control grid, and a suppressor grid 25. The electric valve 17 is poled so as to conduct current from the top conductor 19 to the bottom conductor 20 and has connected in series therewith a resistance 26 between anode 21 and the conductor 19 and also in series therewith a suitable constant voltage device or element, such as a glow discharge valve 27, connected between its cathode 22 and the conductor 20. The glow discharge device 27 serves to maintain the cathode of the device 17 at a substantially constant potential relative to conductor 20 and thereby forms the reference level about which regulation is effected. A capacitor 28 is connected across the resistance 26 and is so designed as to hold a potential across its terminals during the inverse cycle of the alternating voltage applied to valve 17 corresponding to the potential difference existing across resistance 26 during the preceding conducting half cycle of applied voltage. As a means of regulating the current through valve 17, and thereby the potential at the junction 29 between resistance 26 and anode 21, I provide a voltage divider 30 connected across conductors 19 and 20 and connect the control grid 23 to an intermediate point on voltage divider 30 through an adjustable connection 31. The screen grid is connected to the conductor 19 through a resistance 32, which resistance is also connected in series relation with a capacitor 33 and the glow tube 27 to the conductor 20. This connection of the glow tube 27 through the capacitor 33 and resistor 32 across the conductors 19 and 20 has been found desirable in order to permit ionization of the glow tube irrespective of the degree of conduction of the valve 17. The suppressor grid 25 is connected to the cathode 22 in a conventional manner to increase the undistorted output of this device. The electric valve 18 is connected across the conductors 19 and 20 but is reversely connected or poled with respect to the connection of valve 17 so as to conduct current from conductor 20 to conductor 19. The electric valve 18 comprises an anode 34, a cathode 35, a control grid 36 and a screen grid 37. The control grid 36 is connected through a current limiting resistor 36' to the junction point 29 between resistance 26 and anode 22 of valve 17, and, therefore, the potential thereof varies in accordance with the potential of that junction point relative to cathode 35. The creen grid 37 is connected through a resistance 38 to the conductor 20 and, being by-passed back to the anode, is used primarily to provide a higher amplification than is possible with a triode device. The anode circuit of electric valve 18 includes the winding 14 of the control reactor 11 and constitutes the output circuit of the electric valve system. A capacitor 39 may be connected across the winding 14 to absorb any extraneous transient voltages which may appear across the output circuit, and to help hold the flux up during the negative half cycle, thereby increasing the average current in winding 14.

The operation of the embodiment of my invention illustrated in Fig. 1 will be described under the assumption that the motor 2 is operating at normal speed and that the electric valve system is energized to function properly so that generator 1 is operating with the desired output voltage. Assume the voltage of generator 1 tends to rise, for example, due to a speed or load change on output circuit 7. Under these conditions, the voltage at point 31 on voltage divider 30 will increase so that the potential of control grid 23 of electric valve 17 will increase and cause an increase in the anode-cathode current and thereby an increase in current through resistance 26. The capacitor 28 then assumes the increased potential developed across resistor 26 and makes the junction point 29 and consequently control grid 36 of device 18 more negative with respect to its cathode. The increase of current through resistance 26 is also augmented by the increase in potential of the screen grid relative to cathode 22 since substantially the entire change in voltage of the circuit 19—20 appears across resistor 32 due to the constant voltage characteristic of the glow lamp 27. Since the potential of the control grid 23 and screen grid 24 vary in accordance with the voltage to be controlled, the amplification factor of the electric valve 17 will be large and, hence, the sensitivity of the system will be relatively great.

During the inverse half cycle of the alternating voltage of conductors 19—20 immediately following the forward half cycle just described, the electric valve 18 is in a conductive state but the anode-cathode current is reduced because the potential of grid 36 has become more negative with respect to its cathode by the amount of increase in the potential of capacitor 28, which is designed to hold the potential assumed in the preceding forward half cycle. With the decrease in anode current of valve 18, the current through winding 14 and thereby the saturation of saturable reactor 11 is reduced. This reduction in saturation increases the impedance in circuit with rectifier 10 and thereby decreases the voltage applied to the control field winding 9 of generator 1. Since control field winding 9 is arranged in cumulative relation with respect to field winding 8, the net excitation of generator 1 is reduced to return the voltage of circuit 7 to the normal or desired predetermined value. It will be readily understood that a decrease in voltage of load circuit 7 will cause electric valve 17 to decrease its anode current, electric valve 18 to increase its anode current and thereby increase the saturation of saturable reactor 11 to increase the current through control field winding 9 and return the voltage of load circuit 7 to normal.

In Fig. 2 I have illustrated an adaptation of the electric valve regulating system to control the speed of the electric motor 2 and have assigned like numerals to corresponding elements. The alternating current generator 1 of Fig. 1 may now be used for supplying a load circuit as in Fig. 1 or it may be constructed according to the drawing as a tachometer generator 1' if desired, and an additional field winding 5' may be arranged in differential relation with main field winding 5 of the motor. Control field winding 5' is connected to be energized from the output circuit of the rectifier 10 just as the winding 9 of generator 1 was similarly energized. The electric valve regulating system may be the same as shown in Fig. 1 and is represented very schematically by a simple rectangular outline designated 15 to correspond to the valve system of Fig. 1.

The operation of the arrangement illustrated in Fig. 2 is substantially as follows: It will be assumed that the motor is operating at its given speed and that the electric valve system is energized and operating to permit energization of control field winding 5' at the proper value for the given speed. If the motor speed tends to rise, the voltage of tachometer generator 1' will rise and cause a decrease in the direct current of the direct current reactor winding 14 in the manner described above. This action decreases the current in control field winding 5' and results in a net increase in motor field excitation so that the motor speed returns to the normal or the desired predetermined value. If the motor speed decreases, it will readily be understood that the excitation of control field winding 5' is increased thereby causing a decrease in the net excitation of the motor which causes the motor speed to increase to the normal or predetermined value.

In Fig. 3 I have shown another embodiment of my invention for controlling an alternating current generator wherein the control is effected by means of a variable resistance device. For purposes of simplicity, I have illustrated the same basic motor-generator set of Fig. 1 and have assigned the same numerals to corresponding parts. I omit the control winding 9 of Fig. 1 and use the single winding 8 with means in circuit therewith for varying the energization of the winding in accordance with the departure of the quantity to be controlled from a predetermined value. A suitable means to vary the excitation of field winding 8 is a carbon pile resistance regulator 40 in which the pressure on the carbon disks and, hence, the resistance may be varied by several of the various known regulators of this type. For a relatively high frequency generator with a short time constant field circuit a satisfactory arrangement is to use a form of carbon pile in which the pressure of the pile is varied by thermal expansion as determined by the current derived from the electric valve system. As illustrated diagrammatically, the carbon elements 41 are arranged between an insulating base support 42 and a top pressure plate 43 which may be of a suitable insulating material. The pressure on the carbon elements may be varied through a pivoted lever 44 which is connected at one end to the top pressure plate 43 and at the other end to a thermal expansible wire or rod 45. The lever 44 is suitably pivoted at a point 46 intermediate its extremities. The wire 45 is secured at its other extremity to an adjusting screw 47 in a fixed support 48. The same end of the lever 44 to which the wire 45 is attached is biased by a spring 49 in a direction opposite to the pull of the element 45 when it is relatively cold. The adjusting screw 47 is adjusted to place the carbon elements under sufficient pressure to provide a field current which will produce the desired output voltage under normal speed and load conditions. A heater coil 50 is placed in close proximity to the expansible wire 45 and may encircle the wire so as to provide as close a heat transfer relationship as possible. It will be obvious, however, that the thermal expansible element 50 may itself be caused to be traversed by the controlling current and be heated directly in accordance with the current flow. The coil 50 is connected to be energized from the output of the electric valve system 51.

The electric valve system 51 is connected to be energized from the output circuit 7 of generator 1 and may be energized through a transformer 52 when the valve system is not adapted for direct connection to circuit 7. To provide an output voltage varying in the same sense as the quantity to be regulated, I employ three electric discharge devices, such as electric valves 53, 54 and 55 of the high vacuum type, connected across output conductors 56 and 57 of transformer 52. The electric valve 54 is reversely connected with respect to terminal valves 53 and 55. The electric valve 53 is provided with an anode 58, a cathode 59 and a control electrode or grid 60. The electric valve 53 is poled so as to conduct current from the top conductor 56 (as viewed in the drawing) to the bottom conductor 57 and has connected in series therewith a resistance 61 between the anode 58 and the conductor 56 and also in series therewith a suitable constant voltage device or element, such as a glow discharge device 62. The glow discharge device 62 serves to maintain the cathode 59 at a substantially constant potential. A capacitor 63 is connected across resistance 61 and is so designed as to hold a potential across its terminals during the inverse cycle of the alternating voltage applied to valve 53 corresponding to the potential difference existing across resistance 61 during the preceding conducting half cycle of applied voltage. As a means of regulating the current through valve 53 to provide a control potential at a junction point 64 between the resistance 61 and the anode 58, I provide a voltage divider 65 connected across the conductors 56 and 57 and connect the grid 60 to an intermediate point on the voltage divider 65 through an adjustable connection 66.

The electric valve 54 is reversely connected or poled with respect to the connection of valve 53 so as to conduct current from conductor 57 to conductor 56. The electric valve 54 comprises an anode 67, a cathode 68 and a control grid 69. The control grid 69 is connected through a current limiting resistance 69' to the junction point 64 in the anode-cathode circuit of valve 53. Between the anode 67 of valve 54 and the conductor 57, I connect a resistance 70 with a capacitor 71, in parallel therewith, designed and adjusted to provide a control potential from a junction point 72 between anode 67 and resistance 70 on the next half cycle of voltage for electric valve 55. The electric valve 55 is provided with an anode 73, a cathode 74, a control grid 75 and a screen grid 76. The control grid 75 is connected to the junction point 72 between the anode 67 and resistance 70 of valve 54 through a current limiting resistance 75'. The screen grid 76 is connected back to the anode side of valve 55 through a resistance 77 to provide a higher amplification than is possible with a triode valve. The output circuit of the valve system is connected between the conductor 56 and the anode 73 of valve 55 and is connected to energize the heating resistor 50 of the carbon pile regulator.

The operation of the embodiment of my invention illustrated in Fig. 3 will be described under the assumption that the motor 2 is operating at normal speed and that the electric valve system is energized to function properly so that generator 1 is operating with the desired output voltage. Assume the voltage of generator 1 tends to rise. Under these conditions, the voltage at point 66 on the voltage divider 65 will rise so that the potential of control grid 60 will rise and cause an increase in current through valve 53 and thereby an increase in current through resistance 61. The capacitor 63 assumes an increased potential which on the next half cycle, when valve 54 is conductive, renders the control grid 69 more negative with respect to its cathode and decreases the anode current and thereby the current through resistance 70. The capacitor 71 assumes this decreased potential and on the next forward half cycle the control grid 75 of valve 55 is rendered less negative and the current therethrough increases. This increases the current through the regulator heater coil 50 and results in an expansion of the expansible wire 45, resulting in a decrease of pressure on the carbon elements and thereby an increase in resistance in circuit with field winding 8. This increase in resistance reduces the current in field winding 8 to bring the generator voltage back to the desired value. It will be readily understood that a decrease in voltage of load circuit 7 will cause a decrease in the anode current of valve 55 so that the energization of heater coil 50 will be decreased to cause contraction of the expansible rod 45 and result in an increase in the energization of field winding 8 to return the voltage of generator 1 to the desired value.

In Fig. 4 I have illustrated an adaptation of the electric valve regulating system of Fig. 3 to control the speed of the motor 2, and have assigned like numerals to corresponding elements. The alternating current generator 1 of Fig. 1 may now take the form of a tachometer generator 1'. The carbon pile regulator 40' is shown very schematically in slightly modified form so that pressure is arranged to be increased, rather than decreased as in Fig. 3, and the resistance is, therefore, decreased upon expansion of the expansible wire or rod 45. It will be obvious that this reversed operation may be readily accomplished by reversing the bias spring and thermal expansible element 45 relative to the right hand end of lever 44 in Fig. 3. The heater coil 50 is connected to be energized from the output circuit of the electric valve system which may be the same as shown in Fig. 3 and is therefore represented very schematically by a simple rectangular outline designated 51.

The operation of the arrangement illustrated in Fig. 4 is substantially as follows: It will be assumed that the motor 1 is operating at its given speed and that the electric valve system is energized and operating to permit energization of field winding 8 at the proper value for the given speed. If the motor speed tends to rise, the voltage of tachometer generator 1' will rise and cause an increase in the heating current of coil 50 and thereby cause expansion of the element 45 to decrease the resistance of regulator 40. As a result, the excitation of field winding 8 is increased and the motor speed is decreased to the normal value. If the motor speed decreases, the heating current of coil 50 decreases so as to cause contraction of the rod 45 and cause an increase in the resistance of regulator 40. The excitation of field winding 8 is thereby decreased and the motor speed is increased to the normal value.

While I have shown and described particular embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination of a variable voltage alternating current circuit, an electric valve of the high vacuum type provided with control grid and anode-cathode circuits, a load circuit connected to said alternating current circuit through the anode-cathode circuit of said valve, a control electric valve of the high vacuum type provided with control grid and anode-cathode circuits and reversely connected in parallel relation to said first mentioned electric valve across the same conductors of said alternating current circuit, a resistance connected in series relation with said control valve, means for varying the grid potential of said control valve in accordance with the variations in the voltage of said alternating current circuit, a capacitance connected across said resistance, said capacitance being so selected relative to said resistance as to retain during the next succeeding non-conducting half cycle of said control electric valve the voltage difference attained across said resistance during the preceding conducting half cycle, and means for connecting said capacitance in the control grid circuit of said first mentioned electric valve for continuously modulating the current therethrough in accordance with the voltage of said capacitance.

2. The combination of an alternating current supply circuit subject to voltage variations, a direct current load circuit, means for producing a unidirectional voltage in said load circuit which varies with the variations in said supply circuit comprising an electric valve of the high vacuum type connected between said supply circuit and said load circuit and being provided with control grid and anode cathode circuits, a control electric valve of the high vacuum type provided with control grid and anode cathode circuits and reversely connected in parallel relation to said first mentioned valve across the same conductors of said supply circuit, a resistance connected in series relation with said control valve, means for varying the grid potential of said control valve in accordance with the variations in the voltage of said supply circuit, a capacitance connected across said resistance and being so selected relative to said resistance as to retain for the entire period of the next succeeding non-conducting half cycle of said control valve the voltage difference attained across said resistance during the preceding conducting half cycle, and means for connecting said capacitance in the control grid circuit of said first mentioned valve in a manner continuously to modulate the current therethrough in accordance with the voltage of said capacitance.

3. In combination, an alternating current supply circuit, a direct current load circuit, an electric valve connected between said circuits for controlling an electrical condition of said load circuit and comprising a pair of principal electrodes and a control grid, means for controlling the potential of said grid in accordance with the voltage of said supply circuit comprising a control electric valve having an anode, a cathode, and a control grid and a resistance in series connection between the anode of said control valve and one side of said supply circuit, means interposed between the cathode of said control valve and the other side of said supply circuit for maintaining the potential of the cathode substantially constant, means for connecting the grid of said first mentioned electric valve to the junction between said resistance and the anode of said control valve, a capacitor connected across said resistance for impressing upon the grid of said first mentioned valve a potential assumed by said capacitor during the preceding half cycle of voltage applied to said control valve, and means for impressing on the grid of said control valve a potential which varies in accordance with the voltage of said supply circuit.

4. The combination of an alternating current supply circuit subject to voltage variations, a direct current load circuit, means for producing a unidirectional voltage in said load circuit which varies with the variations in said supply circuit comprising an electric valve connected between said supply circuit and said load circuit and being provided with control grid and anode-cathode circuits, a control electric valve provided with an anode, a cathode, a control grid and a screen grid and reversely connected relative to said first mentioned valve across said supply circuit, a resistance connected in series relation with said control valve between the anode thereof and one side of said supply circuit, a glow discharge device connected between the cathode of said control valve and the other side of said supply circuit, a voltage divider connected across said supply circuit, means for connecting the control grid of said control valve to an intermediate point on said voltage divider, means including a second resistance for connecting said screen grid back to the side of said supply circuit to which the anode of said control valve is connected, means comprising a capacitance connected between the junction of said second resistance and said screen grid and said glow discharge device for assuring ionization of said glow discharge device, a capacitance connected across said first mentioned resistance and so selected relative to said resistance as to retain the potential difference attained across said resistance during a preceding conducting half cycle of said control valve, and means for impressing the potential of said second-mentioned capacitance upon the control grid of said first mentioned electric valve during the succeeding non-conducting half cycle of said control valve.

5. In combination, an alternating current supply circuit, a direct current load circuit, rectifying means interconnecting said circuits, a variable impedance connected between said alternating current circuit and said rectifier, means for varying said impedance, means for providing a circuit having an alternating voltage varying in accordance with a variable quantity to be regulated, a controlling electric valve having control grid and anode-cathode circuits, said anode-cathode circuit being connected across said variable voltage circuit to energize said impedance varying means, a control electric valve having an anode, a cathode and a control grid reversely connected with respect to said controlling valve across said variable voltage circuit, a parallel-connected resistance and capacitance being connected between the anode of said control electric valve and one side of said variable voltage circuit, a glow discharge device connected between the cathode of said control electric valve and the other side of said variable voltage circuit, means for connecting the grid of said controlling valve to the juncture between the anode of said control valve and the capacitance associated therewith, and means for energizing the control grid of said control valve in accordance with the variations in voltage of said variable voltage circuit.

6. In combination, an alternating current circuit, a direct current circuit, rectifying means interconnecting said circuits, a variable impedance provided with a direct current control winding and being connected between said alternating current circuit and said rectifying means for providing a variable voltage in said direct current circuit, means for varying the energization of said control winding inversely with the variations of the voltage of said alternating current circuit comprising an electric valve having a control grid and an anode-cathode circuit connected in series relation with said control winding across said alternating current circuit, a control electric valve provided with an anode, a cathode and a control grid connected inversely with respect to said first mentioned electric valve across the same conductors of said alternating current circuit, a parallel-connected resistance and capacitance connected in series relation with said control valve, said capacitance being so selected relative to said resistance as to retain during the next succeeding non-conducting half cycle of said control electric valve the voltage difference attained across said resistance during the preceding conducting half cycle, means for connecting the control grid of said control valve for energization in accordance with the voltage of said alternating current circuit, and means for connecting said parallel-connected resistance and capacitance in the control grid circuit of said first mentioned electric valve.

7. In combination, a dynamo-electric machine having a field winding, an alternating current circuit having produced therein a variable voltage in accordance with an operating condition of said machine, means including a variable impedance provided with a control circuit for varying the energization of said field winding, means including an electric valve provided with a control grid and having an anode-cathode circuit connected in circuit with said impedance control circuit across said alternating current circuit, a control electric valve provided with a control grid and being connected inversely with respect to said first mentioned electric valve across said alternating current circuit, a parallel-connected resistance and capacitance connected in series relation with said control valve, said capacitance being so selected relative to said resistance as to retain during the next succeeding non-conducting half cycle of said control electric valve the voltage difference attained across said resistance during the preceding conducting half cycle, means responsive to the voltage of said alternating current circuit and connected to the control grid of said control valve, and means for connecting said parallel-connected resistance and capacitance in the control grid circuit of said first mentioned electric valve.

8. In combination, an alternating current generator having an output circuit and being provided with a variable direct current field winding for maintaining the voltage of said generator substantially constant, a rectifier for energizing said field winding from said output circuit, a variable impedance comprising a saturable reactor having a control winding and being connected between said output circuit and said rectifier, an electric valve provided with control grid and anode-cathode circuits connected in circuit with said reactor control winding across said output circuit, a control electric valve having an anode, a cathode and a control grid and being connected inversely with respect to said first-mentioned valve across said alternating current circuit, a parallel connected resistance and capacitance connected between the anode of said control valve and said output circuit, a glow discharge device connected between the cathode of said control device and said output circuit, a voltage divider connected across said output circuit and having an intermediate point thereof connected to the control grid of said control electric valve, and means for connecting the grid of said first mentioned valve to the common juncture of said capacitance and the anode of said control valve.

9. In combination, a direct current dynamo-electric machine having a field winding circuit, means including a variable impedance provided with a control circuit for varying the energization of said field winding circuit, an alternating current circuit including means for varying the voltage of said alternating current circuit in accordance with variations in an operating condition of said dynamo-electric machine, an electric valve provided with control grid and anode-cathode circuits connected in circuit with said control circuit of said variable impedance across said alternating current circuit, a control electric valve provided with an anode, a cathode and a control grid and being reversely connected with respect to said first-mentioned valve across said alternating current circuit, a parallel-connected resistance and capacitance connected in series relation with said control valve, said capacitance being so selected relative to said resistance as to retain during the next succeeding non-conducting half cycle of said control electric valve the voltage difference attained across said resistance during the preceding conducting half cycle, means for varying the potential of the control grid of said control valve in accordance with the voltage of said alternating current circuit, and means for connecting said capacitance in the control grid circuit of said first-mentioned valve.

10. The combination of a variable voltage alternating current circuit, a controlling electric valve provided with control grid and anode-cathode circuits, a load circuit connected to said alternating current circuit through the anode-cathode circuit of said valve, a first control electric valve provided with an anode, a cathode and a control grid and reversely connected relative to said controlling valve across said alternating current circuit, a parallel-connected resistance and capacitance connected between the anode of said control valve and one side of said alternating current circuit, means for connecting the control grid of said controlling valve to the juncture between said anode and said capacitance, a second control electric valve having an anode, a cathode and a control grid and reversely connected with respect to said first control valve across said alternating current circuit, a parallel-connected resistance and capacitance connected between said anode of said second control valve and one side of said alternating current circuit, a glow discharge device connected between the cathode of said second control valve and the other side of said alternating current circuit, means for connecting the grid of said first control valve to the juncture between said capacitance associated with said second control valve and the anode of that valve, and means for energizing the grid of said second control valve in accordance with variations in the voltage of said alternating current circuit.

11. In combination, a dynamo-electric machine, a field winding therefor, means for varying the energization of said field winding comprising a thermal responsive element connected for temperature variation in accordance with an operating condition of said machine, an alternating current circuit for producing a voltage variable in accordance with said operating condition, an electric valve having a control grid and an anode-cathode circuit connected to vary the temperature of said thermal responsive element, the anode-cathode circuit of said valve being connected across said alternating current circuit, a control electric valve having an anode, a cathode and a control grid and being reversely connected across said alternating current circuit relative to said first-mentioned electric valve, means responsive to the anode-cathode current of said control valve, means for connecting the control grid of said first-mentioned valve to said last-mentioned means, and means responsive to said alternating voltage for varying the potential of the control grid of said control valve.

12. In combination, an alternating current generator, a direct current field winding for said generator, a carbon pile resistance connected in series relation with said field winding, a thermal responsive element for varying the resistance of said carbon pile, means for varying the heating of said thermal responsive element in the same sense as the variations in the voltage of said output circuit comprising a controlling electric valve provided with control grid and anode-cathode circuits, the anode-cathode circuit of said valve being connected across said output circuit and being associated with said thermal responsive element to vary the temperature thereof in accordance with the anode-cathode current of said valve, a first control electric valve having an anode, a cathode and a control grid and being reversely connected with respect to said controlling electric valve across said output circuit, a parallel-connected resistance and capacitance connected between the anode of said control valve and one side of said output circuit, means for connecting the grid of said controlling valve to the juncture between the anode of said control valve and said capacitance, a second control electric valve having an anode, a cathode and a control grid and being reversely connected with respect to said first control valve across said output circuit, a parallel-connected resistance and capacitance connected between the anode of said second control valve and one side of said output circuit, means for connecting the control grid of said first control valve to the juncture between the anode of said second control valve and the capacitance associated therewith, a glow discharge device connected between the cathode of said second control valve and the side of the output circuit opposite from that of the anode of said second control valve, a voltage divider connected across said output circuit, and adjustable means for connecting the control grid of said second control valve to an intermediate point on said voltage divider.

MARTIN A. EDWARDS.